United States Patent
Ribeiro et al.

(10) Patent No.: US 7,221,130 B2
(45) Date of Patent: May 22, 2007

(54) SWITCHING POWER CONVERTER EMPLOYING PULSE FREQUENCY MODULATION CONTROL

(75) Inventors: Milton D. Ribeiro, Los Altos, CA (US); Kent Kernahan, Cupertino, CA (US)

(73) Assignee: FyreStorm, Inc., Sunnyvale, CA (US)

( * ) Notice: Subject to any disclaimer, the term of this patent is extended or adjusted under 35 U.S.C. 154(b) by 137 days.

(21) Appl. No.: 11/030,688

(22) Filed: Jan. 5, 2005

(65) Prior Publication Data

US 2006/0145678 A1    Jul. 6, 2006

(51) Int. Cl.
*G05F 1/59* (2006.01)

(52) U.S. Cl. ............... 323/271; 323/283; 323/285; 323/299

(58) Field of Classification Search ........... 323/271, 323/282, 283, 285, 299
See application file for complete search history.

(56) References Cited

U.S. PATENT DOCUMENTS

| | | | |
|---|---|---|---|
| 4,349,703 A | 9/1982 | Chea, Jr. | 179/10 HB |
| 5,694,029 A | 12/1997 | Hayes et al. | 323/282 |
| 5,731,694 A * | 3/1998 | Wilcox et al. | 323/287 |
| 5,801,518 A | 9/1998 | Ozaki et al. | 323/222 |
| 5,880,947 A * | 3/1999 | Imanaka et al. | 363/89 |
| 5,945,820 A | 8/1999 | Namgoong et al. | 323/282 |
| 6,057,675 A * | 5/2000 | Tateishi | 323/283 |
| 6,058,030 A * | 5/2000 | Hawkes et al. | 363/65 |
| 6,149,532 A | 11/2000 | Kim | 473/221 |
| 6,154,015 A | 11/2000 | Ichiba | 323/225 |
| 6,166,527 A * | 12/2000 | Dwelley et al. | 323/222 |
| 6,181,123 B1 | 1/2001 | Jou et al. | 323/351 |
| 6,188,252 B1 | 2/2001 | Kawakami | 327/101 |
| 6,400,127 B1 * | 6/2002 | Giannopoulos | 323/283 |
| 6,448,746 B1 | 9/2002 | Carlson | 323/272 |
| 6,456,049 B2 * | 9/2002 | Tsuji | 323/282 |

(Continued)

FOREIGN PATENT DOCUMENTS

WO    WO 00/26740 A    5/2000

OTHER PUBLICATIONS

Endoh, T., et al., "An On-Chip 96.5% Current Efficiency CMOS Linear Regulator Using a Flexible Control Technique of Output Current," *IEEE Journal of Solid-State Circuits*, vol. 36, No. 1, Jan. 2001, pp. 34-39.

(Continued)

*Primary Examiner*—Jeffrey Sterrett
(74) *Attorney, Agent, or Firm*—MacPherson Kwok Chen & Heid LLP; David W. Heid; Michael W. Caldwell

(57) ABSTRACT

A method for controlling a switching power converter provides an efficient algorithm for controlling the output voltage across loads that are relatively light with small transients. When the output voltage is at or below a predetermined first magnitude, a determination is made of the charge required for one or more pulses to increase the output voltage to a predetermined second magnitude which is greater than a target output voltage. Corrective action is taken to raise the output voltage to the second magnitude and the system takes no further corrective action until output voltage is determined to be at or below the first magnitude. The method is useful with synchronous or non-synchronous power converters of buck, boost, buck/boost or other topologies. The method further provides a simple means for determining the amount of charge removed from a battery.

15 Claims, 5 Drawing Sheets

U.S. PATENT DOCUMENTS

| | | | | |
|---|---|---|---|---|
| RE38,140 E | | 6/2003 | Schaffer | 363/65 |
| 6,713,994 B2 | * | 3/2004 | Inaba | 323/283 |
| 6,940,189 B2 | * | 9/2005 | Gizara | 307/151 |
| 6,954,054 B2 | * | 10/2005 | Brown | 323/283 |
| 6,977,488 B1 | * | 12/2005 | Nogawa et al. | 323/271 |
| 7,012,412 B2 | * | 3/2006 | Kanamori et al. | 323/283 |
| 7,098,640 B2 | * | 8/2006 | Brown | 323/283 |

OTHER PUBLICATIONS

Mathews, T., "Switching regulators demystified," Dec. 7, 2000, 8 pp.

Patella, B.J. et al., "High-Frequency Digital Controller IC for DC/DC Converters," 17th Annual IEEE Applied Power Electronics Conference and Exposition, Dallas, TX, Mar. 10-14, 2002, Annual Applied Power Electronics Conference, New York, NY, IEEE, US, vol. 2 of 2, Conf. 17, Mar. 10, 2002, pp. 374-380.

Peterchev, A.V. and Sanders, S.R., "Quantization Resolution and Limit Cycling in Digitally Controlled PWM Converters," *IEEE Power Electronics Specialists Conference*, 2001, 7 pp.

Takeshita, T., et al., "Software Controlled Switched-Mode Power Supply Using DSP," *Electronics and Communications in Japan*, Part 1, vol. 84, No. 4, 2001, pp. 22-31.

Wu, A.M., et al., "Digital PWM Control: Application in Voltage Regulation Modules," *IEEE Power Electronics Specialists Conference*, 1999, vol. 1, pp. 77-83.

Wu, A.M. and Sanders, S.R., "An Active Clamp Circuit for Voltage Regulation Module (VRM) Applications," *IEEE Transactions on Power Electronics*, vol. 16, No. 5, Sep. 2001, pp. 623-634.

Xiao, J., et al., "Architecture and IC Implementation of a Digital VRM Controller," *IEEE Power Electronics Specialists Conference*, 2001, 10 pp.

Sharp, LCD Application Note, Flat Panel Displays, 1999, 5 pp.

Hantronix, Inc., Application Note, Crystal Clear and Visibly Superior LCD Modules, 2001, 5 pp.

Intersil Corporation, intersil™, ISL6523, Data Sheet, Jan. 2002, FN9024.1, pp. 1-16.

International Rectifier, IRU3037/IRU3037A, Data Sheet No. PD94173, pp. 1-11, Mar. 6, 2002.

Applications, Touchscreens 101, http://www.pcioh.com/apps-touch-102.html, Nov. 5, 2002, 2 pp.

3M Touch Systems, MicroTouch™, 2002, 6 pp.

* cited by examiner

| Vin (v) | Tp Calc (sec) | Tp Approx.(sec) |
|---|---|---|
| 3.00 | 2.23E-06 | 2.23E-06 |
| 3.10 | 2.00E-06 | 2.01E-06 |
| 3.20 | 1.83E-06 | 1.83E-06 |
| 3.30 | 1.68E-06 | 1.68E-06 |
| 3.40 | 1.56E-06 | 1.56E-06 |
| 3.50 | 1.46E-06 | 1.46E-06 |
| 3.60 | 1.37E-06 | 1.37E-06 |
| 3.70 | 1.30E-06 | 1.29E-06 |
| 3.80 | 1.23E-06 | 1.23E-06 |
| 3.90 | 1.17E-06 | 1.17E-06 |
| 4.00 | 1.12E-06 | 1.12E-06 |
| 4.10 | 1.07E-06 | 1.07E-06 |
| 4.20 | 1.02E-06 | 1.03E-06 |

| FIG. 1  Circuit Details ||
|---:|---:|
| L (h) | 4.60E-06 |
| C (f) | 13.00E-06 |
| GB1 (sec) | 29.80E-09 |
| GB2 (sec) | 29.80E-09 |
| Vdbh (v) | 2.5125 |
| Vdbl (v) | 2.4875 |
| Vdb (v) | 0.0250 |

FIG. 7

SWITCHING POWER CONVERTER EMPLOYING PULSE FREQUENCY MODULATION CONTROL

CROSS REFERENCE TO RELATED APPLICATIONS

This application is related to commonly assigned U.S. patent application Ser. No. 10/295,580 filed on Nov. 14, 2002, by Kent Kernahan, David F. Fraser and Jack Roan, entitled "Switching Power Converter" which is incorporated herein by reference in its entirety. Patent application Ser. No. 10/295,739, filed Nov. 14, 2002 by Kent Kernahan and John Carl Thomas entitled "Switching Power Converter", now U.S. Pat. No. 6,825,644 issued Nov. 30, 2004 is also incorporated herein by reference in its entirety.

FIELD OF THE INVENTION

This invention relates to switching power converters, the operations of which are computer controlled.

BACKGROUND OF THE INVENTION

A digital switching power supply controller provides the ability to control a power supply through the use of algorithms executing logical decisions rather than by employing prior art techniques which use analog signals which are conditioned by various scale factors. In contrast to the prior art, the present invention relates to a method and circuitry for the regulation of the output voltage in a digital logic-based controller for a switching power supply.

Some products include a sleep, or low power, or standby mode. When a product is battery powered such modes are intended to extend battery life. Hence it is desirable to use a control method that is as efficient as possible. It is further desirable to provide a system and method for maintaining voltage regulation to relatively stable loads which maximizes supply efficiency. Another desirable advancement over the prior art is to provide a simple, low power method of battery energy management.

SUMMARY OF THE INVENTION

The present invention provides a control method which is applicable to a switching power converter and may be utilized with buck, boost and buck/boost topologies, any of which may be synchronous or non-synchronous.

In the method of the present invention, the magnitude of the output voltage of a switching power converter is sensed and compared to a predetermined lower limit voltage. No action is taken until the magnitude of the output voltage is equal to or less than the predetermined lower limit. If the magnitude of the output voltage is equal to or less than the predetermined lower limit, then corrective action is taken to cause the output voltage to increase to a magnitude which is greater than a target output voltage magnitude. The magnitude of the output voltage is monitored and no further corrective action is taken until the magnitude of the output voltage becomes equal to or less than the predetermined lower limit output voltage. The elapsed time between corrective action events is thus variable depending on, for example, the load being supplied by the switching power converter. This method is termed pulse frequency modulation control, or "PFM" control. In accordance with one embodiment of the present invention, PFM control is utilized by a controller in a switching power converter. PFM control is described herein for topologies including synchronous buck, non-synchronous boost, and four-FET buck/boost. One skilled in the art will recognize that the PFM control is applicable to other topologies, such as non-synchronous buck and synchronous boost.

The present invention is particularly advantageous when used in a system in which the load is relatively small and stable. The strategy of the method is summarized as:

1. PFM control of conduction is utilized on an as needed basis.
2. Whenever the magnitude of the output voltage is determined to be equal to or less than a predetermined lower limit, PFM control is activated for corrective action.
3. PFM control utilizes the input voltage and calculates the amount of energy which must be injected into a driver circuit which will be sufficient to raise the output voltage to a predetermined upper voltage which is greater than a target output voltage.
4. The PFM system returns to an inactive mode, waiting until the magnitude of the output voltage is determined to be equal to or less than the predetermined lower limit.

The parameters used by the PFM control method are reused to provide a convenient, low power method for determining how much energy has been removed from a one or more batteries by counting the number of PFM events per second.

BRIEF DESCRIPTION OF THE DRAWINGS

FIG. 7 is a table of the voltages and circuit values for the devices in FIG. 1 used to calculate the table entries of FIG. 6.

DETAILED DESCRIPTION OF THE INVENTION

| Definitions, Acronyms, and Abbreviations | |
|---|---|
| CCM | Continuous Current Mode |
| Coss | FET output capacitance |
| Cycle skipping | Procedure wherein no pulse is applied for one or more time periods |
| DCM | Discontinuous Current Mode |
| DPC | Digital Pulse Controller |
| dX | Change in value of X, where X may be any parameter such as I, V, Tp, Ts, etc. |
| Icoil | Coil current |
| L | Inductance value (h) |

-continued

| Definitions, Acronyms, and Abbreviations | |
|---|---|
| REG | Regulation system, which includes REG_Eng, REG_Sch, SC, SV, Variables and interfaces to DPC, DAS, NFETDVR and SYS, as described in aforementioned U.S. patent application No. 10/295,580 and U.S. Pat. No. 6,825,644 |
| SYS | Microcontroller-based system control as described in aforementioned U.S. patent application No. 10/295,580 and U.S. Pat. No. 6,825,644 |
| T | One time period |
| Tp, $t_p$ | Time period during which a control FET is turned on |
| Ts, $t_s$ | Time period during which a synchronizing FET is turned on, or during which a "low side" diode conducts |
| Vdbh | High dead band limit |
| Vdbl | Low dead band limit |
| Vdb | Dead band width; equals (Vdbh − Vbdl) |
| Vo | Output voltage; voltage across the load |
| Vtar | Target voltage |

Referring to FIG. 12 of U.S. Pat. No. 6,825,464, according to one embodiment of the present invention, PFM control utilizes data from the ADC 1206 block and asserts control through the DPC 1201. The PFM control software resides within REG 1211 and interacts with SYS 1205. These functions are incorporated into the actions which are ascribed to the controller 112, FIG. 1, by the present invention.

Figure 1:
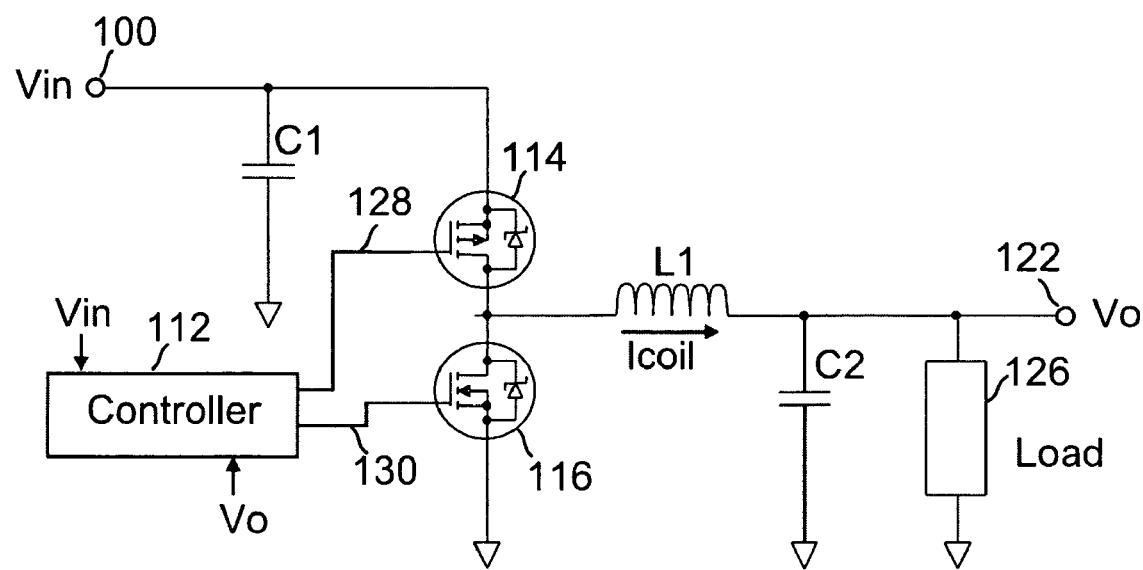
FIG. 1 is a representative synchronous buck power converter.

Referring to FIG. 1, the basic operation of a buck switching power converter is the intermittent connection between an input voltage "Vin" at input terminal 100 and inductor L1 by a control FET 114 for a time termed "Tp". At the end of time Tp, control FET 114 turns off and synchronizing FET 116 is turned on for a time termed "Ts". This is accomplished by a controller 112 supplying conduction control signals to the FETs via lines 128 and 130 which are connected to FETs 114 and 116. This causes current to flow through inductor L1 to the load 126. Output voltage "Vo", measured at output terminal 122, is smoothed by a capacitor C2 120. FET 116 may be replaced by a diode to form a non-synchronous buck supply, in which case line 130 is not needed. Alternatively, as described in U.S. Pat. No. 6,825,644, FET 116 may not be turned on during time period T. In the FIG. 1 topology, Ts is the time during which current from inductor L1 continues to flow after FET 114 is turned off. Said differently, it is the time required for the current to return to zero after time Tp is completed. Those skilled in the art will recognize that the method of the present invention may be applied to any switching power converter topology, including but not limited to buck, boost, and buck/boost wherein any of them may be implemented as synchronous or non-synchronous designs.

Figure 2:
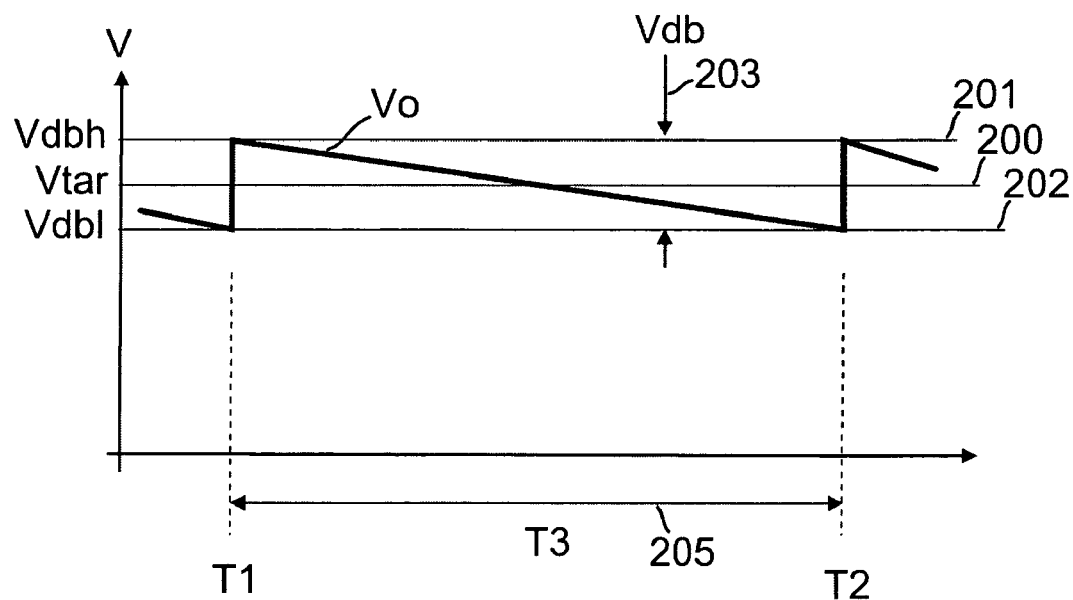
FIG. 2 shows output voltage over time in relation to target, upper, and lower voltage limits.

The PFM control method is illustrated by FIG. 2, wherein Vo falls to a lower dead band limit "Vdbl" 202 at time T1. The controller 112 takes corrective action, raising Vo to approximately the upper dead band limit "Vdbh" 201. This voltage swing is "Vdb" (203)=(Vdbh−Vdbl). Vdbh and Vdbl are defined relative to the desired output voltage "Vtar" 200. Vo will decline over time T3 also indicated by reference character 205 until again reaching Vdbl 202 at time T2, when controller 112 again takes corrective action.

Figure 3:
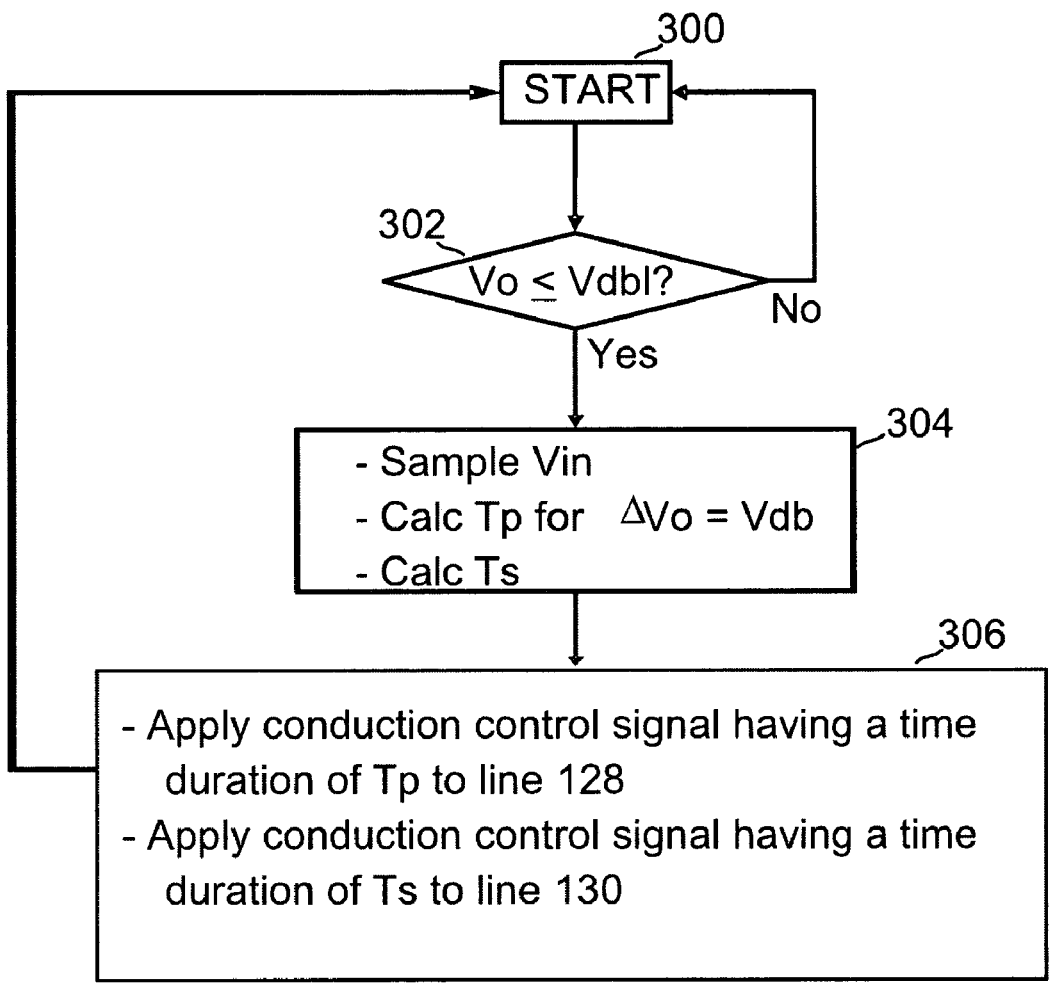
FIG. 3 is a flow chart of the PFM method.

The method of the present invention is represented by the flow chart of FIG. 3. Following Start 300 the system samples Vo of the power converter being controlled. At Step 302 Vo is compared with Vdbl 202. This process continues until Vo is equal to or less than Vdbl 202. At that point the process moves to Step 304. At Step 304 Vin is sampled, and the magnitude of Vin is used to calculate the pulse time Tp needed to raise Vo by Vdb 203. Ts is also calculated. In the synchronous circuit of FIG. 1, FET 116 is driven for the time Ts. In a non-synchronous topology, for example, a circuit of the type shown in FIG. 1 but without FET 116, Ts represents the time during which current will continue to flow from the coil toward load 126 after the control FET 114 is turned off. In Step 306, a conduction control signal of time length Tp is applied to control FET 114 by the controller 112 via line 128. Thereafter, a conduction control signal of time duration Ts is applied to FET 116 via line 130. The PFM control process then returns to Step 300 to resume comparing Vo to Vdbl 202 at Step 302.

The PFM control method may be applied to various topologies. In each case there are alternative implementation strategies which may be selected, depending upon the end product's tolerance for ripple, computing power available, power budget and other factors. Three PFM control embodiments include: a) PFM control using a stored set of pre-calculated Tp and Ts pulse times, from which the pulse times are selected depending on input variables ("Method_1"); b) PFM control based on calculation of Tp and Ts each time corrective action is to be initiated using the present input variables and pre-stored system model parameters ("Method_2"); and c) PFM control based on calculation of Tp and Ts each time corrective action is to be initiated using the present input variables and an estimation of system model parameters, calculated as a function of system response ("Method_3")

Figure 4:
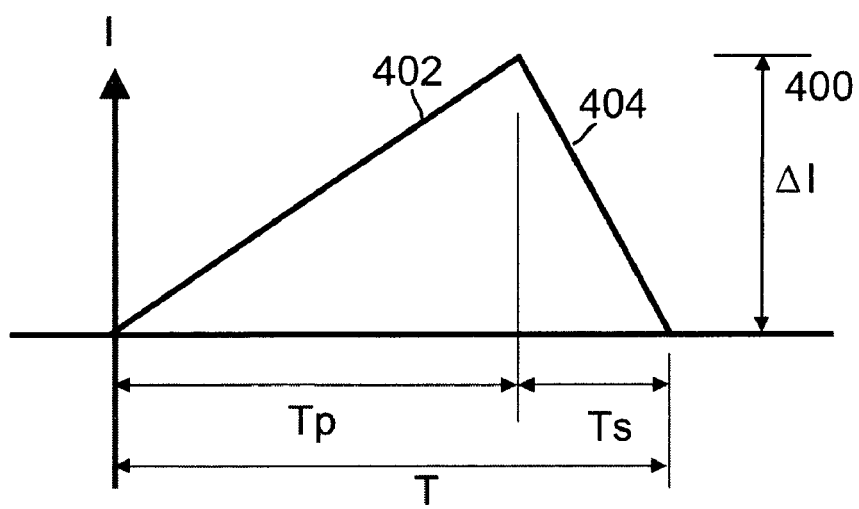
FIG. 4 shows the relationship between time and current during time period T where a single set of control signals are applied to the converter of FIG. 1.

FIG. 4 shows the current through inductor L1 over time. Coil current Icoil rises as indicated by reference character 402 with a slope of $V_1/L$ for the time Tp and falls with the slope $V_2/L$ for the time Ts, where $V_1$ is the voltage across the inductor L1 during Tp, $V_2$ is the voltage across the inductor L1 during Ts, and L is the inductance of inductor L1. The following relationship is derived from the principle of conservation of charge:

$$\Delta Q = \frac{1}{2} \cdot (T_p + T_s) \cdot \Delta I = \frac{1}{2} \cdot \Delta t \cdot \Delta I = C \cdot \Delta V.$$

However, considering that the inductor L1 current starts at zero and returns to zero, this provides:

EQ_1:

$$\frac{V_1 \cdot T_p}{L} = \frac{V_2 \cdot T_s}{L} \Rightarrow V_1 \cdot T_p = V_2 \cdot T_s.$$

Expanding the equation, results in:

$$\Delta t = T_p + T_s = T_p + \frac{V_1}{V_2} \cdot T_p = T_p \cdot \left(1 + \frac{V_1}{V_2}\right).$$

The peak coil current $\Delta I$ 400 is:

$$\Delta I = \frac{V_1 \cdot T_p}{L} = \frac{V_1 \cdot \Delta t}{L \cdot \left(1 + \frac{V_1}{V_2}\right)}.$$

Therefore, using the relationship previously obtained:

$$C \cdot \Delta V = \frac{1}{2} \cdot \Delta t \cdot \Delta I = \frac{1}{2} \cdot \Delta t \cdot \frac{V_1 \cdot \Delta t}{L \cdot \left(1 + \frac{V_1}{V_2}\right)} = \frac{1}{2 \cdot L} \cdot \Delta t^2 \cdot \frac{V_1 \cdot V_2}{V_1 + V_2}.$$

Finally, we have:

EQ_2:

$$\Delta V = \frac{\Delta t^2}{(2 \cdot L \cdot C)} \cdot \frac{(V_1 \cdot V_2)}{(V_1 + V_2)},$$

or:

$$\Delta t = \sqrt{2 \cdot L \cdot C} \cdot \sqrt{\Delta V \cdot \frac{(V_1 + V_2)}{(V_1 \cdot V_2)}}.$$

For the topology of FIG. 1:

$$\Delta V = V_{dbh} - V_{dbl}$$

$$V_1 = V_{in} - V_{out} = V_{in} - V_{tar}$$

$$V_2 = V_{out} = V_{tar}$$

Therefore, combining EQ_1 and EQ_2, and solving for Tp and Ts provides:

EQ_3:

$$T_p = \sqrt{2 \cdot L \cdot C} \cdot \sqrt{\frac{(V_{dbh} - V_{db1}) \cdot V_{tar}}{V_{in} \cdot (V_{in} - V_{tar})}}$$

and

EQ_4:

$$T_s = \frac{V_{in} - V_{tar}}{V_{tar}} \cdot T_p - GB_1 - GB_2, \text{ where}$$

$GB_1$ is the time guard-band between the end of the conduction control signal provided to FET 114, and the beginning of the conduction control signal provided to FET 116, and $GB_2$ is the guard-band between the end of the conduction control signal provided to FET 116 and the beginning of the next conduction control pulse to be provided to FET 114. It is of course desirable to avoid overlapping conduction of the control FET 114 and the synchronizing FET 116. Guard band length is a function of the turn on and off times of the FETs used for FET 114 and FET 116 in the target system, as determined from their data sheet specifications.

Figures 5, 6:
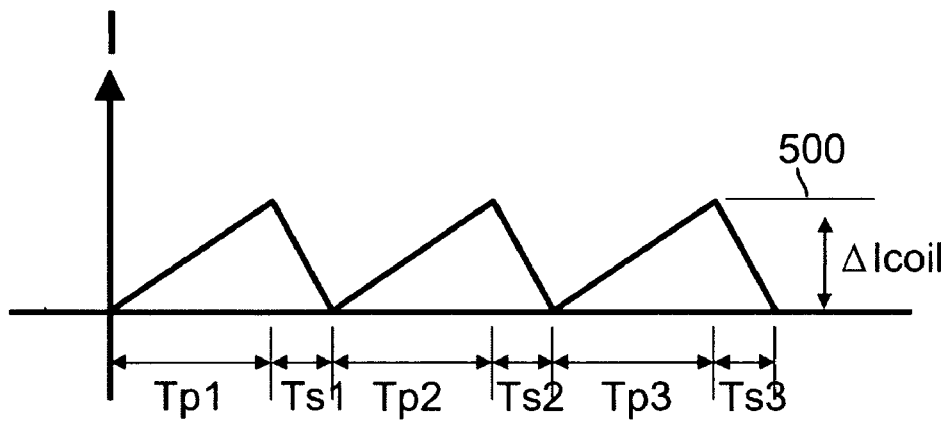
FIG. 5 shows an embodiment wherein correction is achieved by using multiple shorter duration pulses during a correction period rather than a single set of pulses such as that shown in FIG. 4.
FIG. 6 is an example of values in a lookup table used in one embodiment of the invention.

In some designs, a single conduction control signal of length Tp could cause the maximum current in the associated inductor to exceed a maximum acceptable, such as the maximum current rating of the inductor. The associated inductor may have, for example, been selected for a small physical size or other requirements of the design. FIG. 5 illustrates an embodiment wherein the time required for Tp is broken up into multiple, shorter time periods, separated by the appropriate Ts periods, to yield the required charge. In this example Tp is applied in time periods Tp1, Tp2, Tp3, and Ts in time periods Ts1, Ts2, and Ts3, resulting in a lower $\Delta I$ 500. This embodiment may be applied to any of the PFM methods and topologies herein described.

Control Method_1, is accomplished by using EQ_3 and EQ_4 to build a lookup table in which the PFM control utilizes at each activation, the input to the table being Vin. Vo is known to be Vdbl 202 at the time of activation. An example of such a table of values for Tp is shown in FIG. 6. The details of the values for the example are listed in FIG. 7 in the block labeled "FIG. 1 Circuit Details". The exact values calculated are in column "Tp Calc" (FIG. 6).

In the embodiment of Method_2, Tp and Ts are calculated by PFM at each activation, again using EQ_3 and EQ_4. To speed up the calculation, a second order inverse polynomial approximation $(a/(1+b*V_{IN}+c*V_{IN}^2))$ can be used. In this example the constants a, b, and c have been calculated using a Taylor Series to be:

a=6.658E-07
b=0.5349
c=0.0039

The results of this Method_2 are shown in FIG. 6 column "Tp Approx". Comparing the two columns of FIG. 6, it will be appreciated that the error using the approximation is very small.

Method_1 and Method_2 (actually, EQ_3 and EQ_4) ignore the effects of parasitic resistance in the physical circuit of the target application, which effects may amount to as much as a $\Delta V$ error of twenty percent. Parasitic resistance reduces the voltage across inductor L1 during Tp while increasing the negative voltage across inductor L1 during Ts. This results in the conduction permitted by the conduction control signals yielding less charge than expected using the calculations above. To appreciate these effects, reference is made to FIG. 4 from which the following relationship is derived from the principle of conservation of charge:

$$\Delta Q = \frac{1}{2} \cdot (T_p + T_s) \cdot \Delta I = C \cdot \Delta V$$

and $$\Delta Q_1 = \frac{1}{2} \cdot T_p \cdot \Delta I = C \cdot \Delta V_1$$

However, considering that the inductor L1 current starts at zero and returns to zero yields:

$$\Delta I = \frac{1}{L} \cdot \int_0^{T_p} V_1 \cdot dt = \frac{1}{L} \cdot \int_0^{T_s} V_2 \cdot dt$$

Assuming that input and output voltages do not change significantly over Tp and Ts results in:

$$V_1 = V_{in} - V_{out} - R_p \cdot I$$

and $$V_2 = V_{out} + R_s \cdot I$$

where $R_p$ is the parasitic resistance in the current path during Tp and $R_s$ is the parasitic resistance in the current path during Ts. Solving the integral provides:

$$\Delta I = \frac{1}{L} \cdot \int_0^{T_p} V_1 \cdot dt$$

$$= \frac{1}{L} \cdot \int_0^{T_p} (V_{in} - V_{out} - R_p \cdot I) \cdot dt$$

$$= \frac{T_p \cdot (V_{in} - V_{out})}{L} - \frac{R_p}{L} \cdot \int_0^{T_p} I \cdot dt$$

$$= \frac{T_p \cdot (V_{in} - V_{out})}{L} - \frac{R_p}{L} \cdot \Delta Q_1$$

However, assuming that:

$$\Delta Q_1 \cong \frac{T_p \cdot \Delta I}{2}$$

Which yields:

$$\Delta I = \frac{T_p \cdot (V_{in} - V_{out})}{L} - \frac{R_p}{L} \cdot \frac{T_p \cdot \Delta I}{2}$$

Finally,

EQ_5:

$$\Delta I = \frac{T_p \cdot (V_{in} - V_{out})}{L \cdot \left(1 + \frac{T_p \cdot R_p}{2 \cdot L}\right)} \cong T_p \cdot \left(1 - \frac{T_p \cdot R_p}{2 \cdot L}\right) \cdot \frac{(V_{in} - V_{out})}{L}$$

Repeating the same derivation for the second slope of the inductor L1 current (during Ts time) provides:

EQ_6:

$$\Delta I = \frac{T_s \cdot V_{out}}{L \cdot \left(1 - \frac{T_s \cdot R_s}{2 \cdot L}\right)} \cong T_s \cdot \left(1 + \frac{T_s \cdot R_s}{2 \cdot L}\right) \cdot \frac{V_{out}}{L}$$

From EQ_5 and EQ_6, the relationship between Tp and Ts is derived, specifically:

$$\frac{T_s \cdot V_{out}}{L \cdot \left(1 - \frac{T_s \cdot R_s}{2 \cdot L}\right)} = \frac{T_p \cdot (V_{in} - V_{out})}{L \cdot \left(1 + \frac{T_p \cdot R_p}{2 \cdot L}\right)} \Rightarrow$$

$$\Rightarrow T_s = T_p \cdot \frac{(V_{in} - V_{out})}{V_{out}} \cdot \frac{\left(1 - \frac{T_s \cdot R_s}{2 \cdot L}\right)}{\left(1 + \frac{T_p \cdot R_p}{2 \cdot L}\right)}$$

$$\cong T_p \cdot \frac{(V_{in} - V_{out})}{V_{out}} \cdot \left[1 - \frac{1}{2 \cdot L} \cdot (T_s \cdot R_s + T_p \cdot R_p)\right]$$

Ignoring second order effects:

$$T_s \cong T_p \cdot \frac{(V_{in} - V_{out})}{V_{out}}$$

Therefore:

$$T_s \cong T_p \cdot \frac{(V_{in} - V_{out})}{V_{out}} \cdot \left[1 - \frac{T_p}{2 \cdot L} \cdot \left(R_p + \frac{(V_{in} - V_{out})}{V_{out}} \cdot R_s\right)\right]$$

The total charge transferred to the output is found by $$\Delta Q = C \cdot \Delta V \cong \frac{(T_p + T_s) \cdot \Delta I}{2} \qquad \text{EQ\_7}$$

Now, assuming that $R = R_p \cong R_s$ and that Tp will only be adjusted over a narrow region ($T_{p(min)} \leq T_p \leq T_{p(max)}$) or $$T_{pa} = \frac{T_{p(min)} + T_{p(max)}}{2}.$$

The above provides:

$$\Delta I \cong T_p \cdot (1 - k_p) \cdot \frac{(V_{in} - V_{out})}{L}, \qquad \text{EQ\_8}$$

where $$k_p = \frac{T_{pa} \cdot R}{2 \cdot L}$$

and $$T_s \cong T_p \cdot \frac{(V_{in} - V_{out})}{V_{out}} \cdot \left[1 - k_p \cdot \left(\frac{V_{in}}{V_{out}}\right)\right] \qquad \text{EQ\_9}$$

Combining EQ_7, EQ_8, and EQ_9 gives:

$$T_p + T_s \cong T_p \cdot \left\{1 + \frac{(V_{in} - V_{out})}{V_{out}} \cdot \left[1 - k_p \cdot \left(\frac{V_{in}}{V_{out}}\right)\right]\right\}$$

$$= T_p \cdot \left[\frac{V_{in}}{V_{out}} - k_p \cdot \frac{(V_{in} - V_{out})}{V_{out}} \cdot \left(\frac{V_{in}}{V_{out}}\right)\right]$$

$$= T_p \cdot \left(\frac{V_{in}}{V_{out}}\right) \cdot \left(1 - k_p \cdot \frac{V_{in} - V_{out}}{V_{out}}\right)$$

$$\Delta Q = C \cdot \Delta V \cong \frac{1}{2} \cdot T_p \cdot \left(\frac{V_{in}}{V_{out}}\right) \cdot \left(1 - k_p \cdot \frac{V_{in} - V_{out}}{V_{out}}\right) \cdot T_p \cdot (1 - k_p) \cdot$$

$$\frac{(V_{in} - V_{out})}{L}$$

$$= \frac{1}{2 \cdot L} \cdot T_p^2 \cdot \left(\frac{V_{in}}{V_{out}}\right) \cdot (V_{in} - V_{out}) \cdot$$

$$\left(1 - k_p \cdot \frac{V_{in} - V_{out}}{V_{out}}\right) \cdot (1 - k_p)$$

$$\cong \frac{1}{2 \cdot L} \cdot T_p^2 \cdot \left(\frac{V_{in}}{V_{out}}\right) \cdot (V_{in} - V_{out}) \cdot \left(1 - k_p \cdot \frac{V_{in}}{V_{out}}\right)$$

Using the same name conventions as before, Tp and Ts can be solved by $$T_p \cong \left(1 + \frac{k_p}{2} \cdot \frac{V_{in}}{V_{tar}}\right) \cdot \sqrt{2 \cdot L \cdot C} \cdot \qquad \text{EQ\_10}$$

$$\sqrt{\frac{V_{tar}}{V_{in} - V_{tar}}} \cdot \sqrt{\frac{V_{dbh} - V_{dbl}}{V_{in}}}$$

and

-continued $$T_s \cong T_p \cdot \frac{V_{in} - V_{tar}}{V_{tar}} \cdot \left(1 - k_p \cdot \frac{V_{in}}{V_{tar}}\right) - GB_1 - GB_2, \quad \text{EQ\_11}$$

where $$k_p = \frac{R}{4 \cdot L} \cdot (T_{p(\min)} + T_{p(\max)}) \quad \text{EQ\_12}$$

Equations EQ_10, EQ_11, and EQ_12 represent an embodiment of PFM Method_3, which is basically Method_2 with the refinement of adjustment for parasitics. However Method_3 utilizes static component values estimated by the designer.

The precise value of model parameters cannot be known in advance, causing significant variance. That is especially true for the values of L and C. They might vary as much 20% each, for a potential combined variation of 40% from assumed values.

A more accurate embodiment of Method_3 compares the actual variation of the output voltage ($\Delta V_{actual}$), the amount by which Vo changed as the result of one pulse, in relation to the deployed pulse width of the conduction control signal applied to the control FET 114, deriving the effective value of the L and C per:

$$\Delta Q = C \cdot \Delta V_{actual}$$
$$\cong \frac{1}{2 \cdot L} \cdot T_p^2 \cdot \left(\frac{V_{in}}{V_{out}}\right) \cdot (V_{in} - V_{out}) \cdot \left(1 - k_p \cdot \frac{V_{in}}{V_{out}}\right)$$

Therefore $$\sqrt{2 \cdot L \cdot C} \cong T_p \cdot \sqrt{\frac{V_{in} - V_{tar}}{\Delta V_{actual}} \cdot \left(\frac{V_{in}}{V_{tar}} - k_p\right)}.$$

From this it will be appreciated that the specific values for L and C are not needed, only the product LC. The parameter $\sqrt{2 \cdot L \cdot C}$ is estimated by measuring Vo after each pulse deployed and updating the model (EQ_10). In other embodiments, EQ_10 is slowly adapted using a rolling average technique, or periodically adjusted per a time schedule or other scheme. This approach adjusts for actual component values, including the effect of temperature during operation and longer term changes due to component aging.

Figure 8:
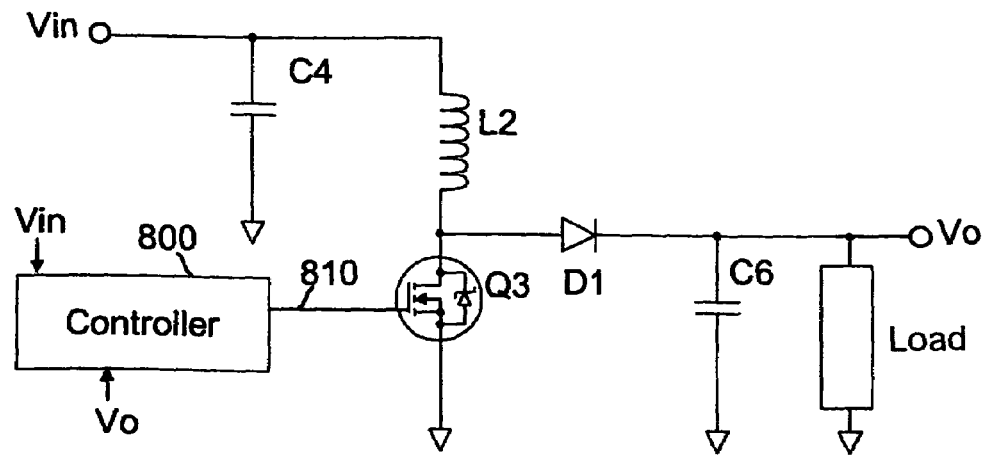
FIG. 8 illustrates a non-synchronous boost converter.

In another embodiment, the PFM control method is utilized with a non-synchronous boost converter, such as shown in FIG. 8. Controller 800 provides a conduction control signal to FET Q3 via line 810, thus permitting current to flow in the inductor L2 for a length of time Tp. Thereafter the conduction control signal is terminated and current of inductor L2 flows through diode D1 for a length of time Ts.

The width of the pulse of current (Tp+Ts) is calculated using the method of the present invention (PFM), and can be implemented in any of the following ways: a) PFM control using a stored set of pre-calculated pulses, from which it selects depending on its input variables; b) PFM control based on a calculation of a duration for Tp and Ts each time corrective action is to be initiated using the present input variables and pre-stored system model parameters; and c) PFM control based on calculation of Tp and Ts each time corrective action is to be initiated using present input variables and an estimation of system model parameters, calculated as a function of system response. The first embodiment is presented; one skilled in the art will understand other embodiments similar to those previously discussed as Method_2 and Method_3.

Vin is assumed to be within a restricted range of voltages: $V_{in(min)} \leq V_{in} \leq V_{in(max)}$. Looking to FIG. 8, we have the following relationship derived from the principle of conservation of charge:

$$\Delta Q = \frac{1}{2} \cdot T_s \cdot \Delta I = C \cdot \Delta V$$

However, considering that the current in inductor L2 starts at 0 and returns to 0, this provides:

$$\frac{V_1 \cdot T_p}{L} = \frac{V_2 \cdot T_s}{L} \Rightarrow V_1 \cdot T_p = V_2 \cdot T_s$$

where $V_1$ is the voltage across the inductor L2 during time Tp and $V_2$ is the voltage across the inductor L2 during time Ts.

The peak current in inductor L2 ($\Delta I$) is:

$$\Delta I = \frac{V_2 \cdot T_s}{L} = \frac{V_1 \cdot T_p}{L}$$

Therefore, using the relationship previously obtained:

$$C \cdot \Delta V = \frac{1}{2} \cdot T_s \cdot \Delta I = \frac{1}{2} \cdot \frac{V_1 \cdot T_p}{V_2} \cdot \frac{V_1 \cdot T_p}{L}$$

Now $$\Delta V = \frac{T_p^2}{2 \cdot L \cdot C} \cdot \frac{V_1^2}{V_2}, \text{ or}$$

$$T_p = \frac{1}{V_1} \cdot \sqrt{2 \cdot L \cdot C \cdot \Delta V \cdot V_2}.$$

For the implementation of FIG. 8, this provides:

$\Delta V = V_{dbh} - V_{dbl}$, $V_1 = V_{in}$, and $V_2 = V_{out} + V_D - V_{in} = V_{tar} + V_D - V_{in}$, where $V_D$ is the drop across diode 808. Thus Tp, the only control parameter for a non-synchronous implementation, can be calculated as $$T_p = \frac{\sqrt{2 \cdot L \cdot C \cdot (V_{dbh} - V_{dbl})}}{V_{in}} \cdot \sqrt{V_{tar} + V_D - V_{in}}.$$

Figure 9:
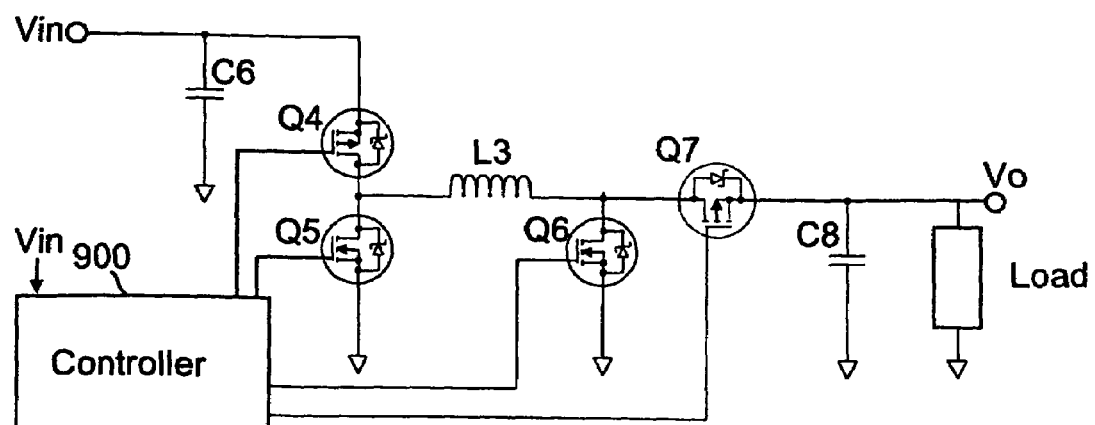
FIG. 9 illustrates a four transistor buck/boost converter.

In another embodiment of the present invention PFM control is used to regulate a multiple transistor buck/boost power converter, such as that in FIG. 9, useful for producing an output voltage Vo which is either higher or lower than input voltage Vin.

The controller 900, using times calculated by the PFM control methods, injects pulses of current into inductor L3, by closing switches Q4 and Q6, for a length of time Tp; and thereafter opening them, letting the coil current flow thru MOSFETs Q5, and Q7 for a length of time Ts. MOSFETs Q5 and Q7 may be replaced with diodes.

Looking again to FIG. 9, the following relationship is derived from the principle of conservation of charge:

$$\Delta Q = \frac{1}{2} \cdot (T_p + T_s) \cdot \Delta I = C \cdot \Delta V$$

$$\Delta Q_1 = \frac{1}{2} \cdot T_p \cdot \Delta I = C \cdot \Delta V_1$$

However, considering that the inductor L3 current starts at zero and returns to zero, this provides:

$$\Delta I = \frac{1}{L} \cdot \int_0^{T_p} V_1 \cdot dt = \frac{1}{L} \cdot \int_0^{T_s} V_2 \cdot dt$$

Assuming that input and output voltages do not change significantly over Tp and Ts, results in:

$$V_1 = V_{in} - R_p \cdot I$$

$$V_2 = V_{out} + R_s \cdot I$$

Where:
$R_p$ is the parasitic resistance in the current path during Tp and $R_s$ is the parasitic resistance in the current path during Ts.

Solving the integral, provides:

$$\Delta I = \frac{1}{L} \cdot \int_0^{T_p} V_1 \cdot dt$$
$$= \frac{1}{L} \cdot \int_0^{T_p} (V_{in} - R_p \cdot I) \cdot dt$$
$$= \frac{T_p \cdot V_{in}}{L} - \frac{R_p}{L} \cdot \int_0^{T_p} I \cdot dt$$
$$= \frac{T_p \cdot V_{in}}{L} - \frac{R_p}{L} \cdot \Delta Q_1$$

However, assuming that:

$$\Delta Q_1 \cong \frac{T_p \cdot \Delta I}{2} \text{ we find}$$

$$\Delta I = \frac{T_p \cdot V_{in}}{L} - \frac{R_p}{L} \cdot \frac{T_p \cdot \Delta I}{2}$$

Finally, $$\Delta I = \frac{T_p \cdot V_{in}}{L \cdot \left(1 + \frac{T_p \cdot R_p}{2 \cdot L}\right)} \cong T_p \cdot \left(1 - \frac{T_p \cdot R_p}{2 \cdot L}\right) \cdot \frac{V_{in}}{L} \quad \text{EQ\_13}$$

Repeating the same reasoning for the slope of the inductor L3 current during the Ts time we have:

$$\Delta I = \frac{T_s \cdot V_{out}}{L \cdot \left(1 - \frac{T_s \cdot R_s}{2 \cdot L}\right)} \cong t_s \cdot \left(1 + \frac{T_s \cdot R_s}{2 \cdot L}\right) \cdot \frac{V_{out}}{L} \quad \text{EQ\_14}$$

From EQ_13 and EQ_14, the relationship between Tp and Ts is:

$$\frac{T_s \cdot V_{out}}{L \cdot \left(1 - \frac{T_s \cdot R_s}{2 \cdot L}\right)} = \frac{T_p \cdot V_{in}}{L \cdot \left(1 + \frac{T_p \cdot R_p}{2 \cdot L}\right)} \Rightarrow$$

$$\Rightarrow T_s = T_p \cdot \frac{V_{in}}{V_{out}} \cdot \frac{\left(1 - \frac{T_s \cdot R_s}{2 \cdot L}\right)}{\left(1 + \frac{T_p \cdot R_p}{2 \cdot L}\right)}$$

$$\cong t_p \cdot \frac{V_{in}}{V_{out}} \cdot \left[1 - \frac{1}{2 \cdot L} \cdot (T_s \cdot R_s + T_p \cdot R_p)\right]$$

Ignoring second order effects:

$$T_s \cong T_p \cdot \frac{V_{in}}{V_{out}}$$

Therefore, $$T_s \cong T_p \cdot \frac{V_{in}}{V_{out}} \cdot \left[1 - \frac{T_p}{2 \cdot L} \cdot \left(R_p + \frac{V_{in}}{V_{out}} \cdot R_s\right)\right].$$

The total charge transferred to the output is:

$$\Delta Q = C \cdot \Delta V \cong \frac{(T_p + T_s) \cdot \Delta I}{2} \quad \text{EQ\_15}$$

Now, assuming the following conditions:

$R = R_p \cong R_s$, and $(T_{p(min)} \leq T_p \leq T_{p(max)})$ will only be adjusted over a narrow region, given as $$T_{pa} = \frac{T_{p(min)} + T_{p(max)}}{2},$$

yields:

$$\Delta I \cong T_p \cdot (1 - k_p) \cdot \frac{V_{in}}{L}, \quad \text{EQ\_16}$$

where $k_p = \frac{T_{pa} \cdot R}{2 \cdot L}$, and $$T_s \cong T_p \cdot \frac{V_{in}}{V_{out}} \cdot \left[1 - k_p \cdot \left(1 + \frac{V_{in}}{V_{out}}\right)\right]. \quad \text{EQ\_17}$$

Combining EQ_15, EQ_16 and EQ_17 yields:

$$T_p + T_s \cong T_p \cdot \left\{1 + \frac{V_{in}}{V_{out}} \cdot \left[1 - k_p \cdot \left(1 + \frac{V_{in}}{V_{out}}\right)\right]\right\}$$

$$= T_p \cdot \left[1 + \frac{V_{in}}{V_{out}} - k_p \cdot \frac{V_{in}}{V_{out}} \cdot \left(1 + \frac{V_{in}}{V_{out}}\right)\right]$$

$$= T_p \cdot \left(1 + \frac{V_{in}}{V_{out}}\right) \cdot \left(1 - k_p \cdot \frac{V_{in}}{V_{out}}\right)$$

$$\Delta Q = C \cdot \Delta V$$

$$\cong \frac{1}{2} \cdot T_p \cdot \left(1 + \frac{V_{in}}{V_{out}}\right) \cdot \left(1 - k_p \cdot \frac{V_{in}}{V_{out}}\right) \cdot T_p \cdot (1 - k_p) \cdot \frac{V_{in}}{L}$$

$$= \frac{1}{2} \cdot T_p^2 \cdot \frac{V_{in}}{L} \cdot \left(1 + \frac{V_{in}}{V_{out}}\right) \cdot \left[1 - k_p \cdot \left(1 + \frac{V_{in}}{V_{out}}\right)\right]$$

Then, using the same name conventions used above in Method 1, the solution for the circuit of FIG. 9 is:

$$T_p \cong \left[1 + \frac{k_p}{2} \cdot \left(1 + \frac{V_{in}}{V_{tar}}\right)\right] \cdot \sqrt{2 \cdot L \cdot C} \cdot \sqrt{\frac{V_{tar}}{V_{in}}} \cdot \sqrt{\frac{V_{dbh} - V_{dbl}}{V_{in} + V_{tar}}}$$

$$T_s \cong T_p \cdot \frac{V_{in}}{V_{tar}} \cdot \left[1 - k_p \cdot \left(1 + \frac{V_{in}}{V_{tar}}\right)\right] - GB_1 - GB_2$$

$$k_p = \frac{R}{4 \cdot L} \cdot (T_{p(\min)} + T_{p(\max)})$$

A further benefit of the PFM control method is the ability to make use of the information used in PFM control to derive an estimate of the current delivered to the power converter. For a battery-powered device this is useful in "fuel gauging", i.e., keeping track of how much energy remains in a one or more batteries used for power.

The method used is to accumulate voltage changes. A count (PR) is kept of how many pulses get deployed per second. The amount of charge in each pulse is $$\Delta Q = C \cdot \Delta V_{actual} = C \cdot (V_{dbh} - V_{dbl}).$$

Therefore an estimate of the load current is given by $$I_{load} = PR \cdot \Delta Q = PR \cdot C \cdot (V_{dbh} - V_{dbl}).$$

For the circuit of FIG. 1, the accuracy of this calculation depends upon the tolerance of the capacitor C2. Since all terms are relatively fixed, it is possible to keep track of current, hence energy removed from the battery, by simply counting the number of pulses.

We claim:

1. A method for regulating an output voltage applied to a load at an output terminal of a power converter to maintain the output voltage within a range of voltages above and below a target voltage, the power converter including an output capacitor coupled between the output terminal and a ground reference, the method comprising:
    sensing a magnitude of the output voltage;
    comparing the magnitude of the output voltage to a first predetermined voltage value and if the output voltage is equal to or less than the first predetermined value determining a characteristic of a conduction control signal required to cause the output voltage to attain a second predetermined voltage value which is greater than the target voltage; and
    providing a conduction control signal having the characteristic to the power converter.

2. The method according to claim 1, wherein providing the conduction control signal comprises providing the conduction control signal to one switch in the power converter.

3. The method according to claim 2, wherein determining a characteristic of a conduction control signal comprises calculating a length of one conduction control signal for application within a switching cycle.

4. The method according to claim 2, wherein determining a characteristic of a conduction control signal comprises calculating a length of a plurality of conduction control signals for application within a switching cycle.

5. The method according to claim 2, wherein the power converter includes an input terminal for connection to a source of electrical potential, and further wherein providing the conduction control signal comprises:
    storing a characteristic of a plurality of conduction control signals for corresponding magnitude values of electrical potentials; and
    sensing a magnitude of the electrical potential at the input terminal and providing, based on a comparison of the sensed potential to the stored magnitude values, the conduction control signal corresponding to the sensed magnitude of voltage at the input terminal.

6. The method according to claim 1, wherein the power converter includes first and second switches, and further wherein determining a characteristic of a conduction control signal comprises:
    determining a length of a conduction control signal to be applied to the first and second switches as a function of a value of an input voltage to the power converter.

7. The method of claim 6, wherein determining a length of the conduction control signals comprises:
    calculating the length of the signals as a function of stored model circuit parameters of circuit elements in the power converter.

8. The method of claim 6, wherein determining a length of the conduction control signals comprises:
    calculating the length of the signals as a function of estimated circuit parameters of circuit elements in the power converter.

9. The method according to claim 1, wherein the power converter, includes an input terminal for connection to a source of electrical potential and further wherein determining a characteristic of the conduction control signal comprises:
    sensing a magnitude of a voltage at the input terminal; and
    calculating a length of the conduction control signal as a function of the magnitude of the voltage at the input terminal.

10. The method according to claim 9, wherein calculating a length of a conduction control signal comprises:
    storing parameters of one or more circuit elements in the power converter; and
    calculating the length of the conduction control signal as a function of the stored circuit parameters.

11. The method according to claim 9, wherein calculating a length of a conduction control signal comprises:
    storing estimated parameters of circuit elements in the power converter; and
    calculating the length of the conduction control signal as a function of the stored estimated circuit parameters.

12. The method according to claim 9, wherein calculating a length of a conduction control signal as a function of the magnitude of the voltage at the input terminal comprises:
    utilizing in the calculation of the length of the conduction control signal for a to be performed voltage correction an operational result from a prior-correction event.

13. The method according to claim 12, further comprising:
   storing operational results from a plurality of correction events; and
   calculating the length of the conduction control signal for a to be performed voltage correction as a function of the operational results of the plurality of correction events.

14. The method according to claim 12, further comprising:
   determining from the operational result from a prior correction event a magnitude of a term for a calculation algorithm used to calculate a length of the conduction control signal.

15. The method according to claim 14, wherein the term is a function of an inductive and a capacitive characteristic of circuitry in the power converter.

* * * * *